(12) United States Patent
Goldberg et al.

(10) Patent No.: US 7,007,303 B2
(45) Date of Patent: Feb. 28, 2006

(54) SYSTEMS AND METHODS FOR AUTHENTICATING DOCUMENTS

(75) Inventors: David Goldberg, Palo Alto, CA (US); Steven J. Harrington, Webster, NY (US); Marshall W. Bern, San Carlos, CA (US)

(73) Assignee: Xerox Corporation, Stamford, CT (US)

(*) Notice: Subject to any disclaimer, the term of this patent is extended or adjusted under 35 U.S.C. 154(b) by 931 days.

(21) Appl. No.: 09/682,722

(22) Filed: Oct. 10, 2001

(65) Prior Publication Data

US 2003/0068066 A1    Apr. 10, 2003

(51) Int. Cl.
G06K 9/00    (2006.01)

(52) U.S. Cl. .................. 726/26; 713/176; 382/292; 726/2

(58) Field of Classification Search ............. 713/150, 713/168, 176, 200, 202; 382/100, 181, 190, 382/276, 286, 291, 292
See application file for complete search history.

(56) References Cited

U.S. PATENT DOCUMENTS

| | | | | |
|---|---|---|---|---|
| 5,038,392 A | * | 8/1991 | Morris et al. | 382/175 |
| 5,222,160 A | * | 6/1993 | Sakai et al. | 382/185 |
| 5,486,686 A | * | 1/1996 | Zdybel et al. | 235/375 |
| 5,615,268 A | * | 3/1997 | Bisbee et al. | 713/176 |
| 5,966,127 A | * | 10/1999 | Yajima | 715/764 |
| 6,161,107 A | * | 12/2000 | Stern | 707/104.1 |
| 6,606,418 B1 | * | 8/2003 | Mitchell et al. | 382/251 |
| 6,681,372 B1 | * | 1/2004 | Yajima | 715/541 |

* cited by examiner

Primary Examiner—Christopher Revak
(74) Attorney, Agent, or Firm—Oliff & Berridge, PLC (57) ABSTRACT

A method and device for creating a notarized document from a document, comprising acquiring image data of the document; generating a document data file based on the image data, the document data file comprising a exemplar table and a block table; and appending the document data file to the document.

16 Claims, 10 Drawing Sheets

| Exemplar ref no. | Exemplar | x | y | w | h | fiducial pt. |
|---|---|---|---|---|---|---|
| 0 | move left | | | | | |
| 1 | move right | | | | | |
| 2 | etc | | | | | |
| 3 | etc | | | | | |
| 4 | etc | | | | | |
| 5 | l | a | b | c | d | 0 |
| 6 | y | e | f | g | h | 0 |
| 7 | h | i | j | k | l | 0 |
| 8 | e | m | n | o | p | 0 |
| 9 | o | q | r | s | t | u |

FIG. 11

| Line # | Start x | Start y | Exemplars and position commands |
|---|---|---|---|
| 1 | v | w | 7,8,5,5,9, |
| 2 | z | aa | 6, 1, 6 |

FIG. 12

SYSTEMS AND METHODS FOR AUTHENTICATING DOCUMENTS

BACKGROUND OF THE INVENTION

1. Field of Invention

This invention is directed to systems and methods for authenticating documents.

2. Description of Related Art

A receiver of a document often wants to ensure that the document is an unchanged original from a sender. Thus, senders have endeavored to add security measures to their documents so that a receiver can verify that the document is genuine.

One security measure that is employed is outlined in the commonly owned U.S. patent application Ser. No. 09/346,559 filed on Jun. 30, 1999, (hereinafter the '559 application), which is incorporated herein by reference in its entirety. The '559 application discloses methods of compressing an original document image, digitally signing the compressed image data and writing the signed compressed image data onto unused space of the document. The receiver/verifier then receives the document, including the signed compressed image data. The verifier generates a verifying image from the signed compressed image data and compares the verifying image to the original document to ensure that the document has not been altered.

SUMMARY OF THE INVENTION

In compressing the original document image, elements of the document image are represented by tokens or symbols. The compressed file will include one representative of each group of similar tokens, i.e., an exemplar. However, this negatively affects the compression ratio and increases the size of the compressed image data to be written to the unused space of the document.

This invention provides systems and methods for authenticating hardcopy documents.

This invention separately provides systems and methods for authenticating electronic documents that are stored or archived as a hardcopy document.

This invention separately provides systems and methods that append a file to a document that will allow a receiver to subsequently recreate the original document from the appended file.

This invention separately provides systems and methods for generating a document data file representing the document that has a better compression ratio of the document than document representation files generated from conventional methods and systems.

This invention separately provides systems and methods for generating a document data file representing the document that does not require as much physical space on the document as conventional methods and systems.

Document authentication according to the various exemplary embodiments of systems and methods according to this invention is accomplished by acquiring document image data and then generating a document data file. The document data file includes an exemplar table and a block table. The exemplar table includes a pointer reference for each representative exemplary symbol in the document. The document data file is compressed and digitally signed by the sender. The sender appends the file to the document. The document is then sent to the receiver. The receiver then acquires a received document image data file including the appended document data file. From the document data file, the receiver generates a verifying copy of the document and compares the verifying copy to the received document image data. If the document is different from the verifying document, then the receiver knows that the document is not genuine or that it has been altered. If there are at most minor differences between the two, then receiver knows the document is genuine.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
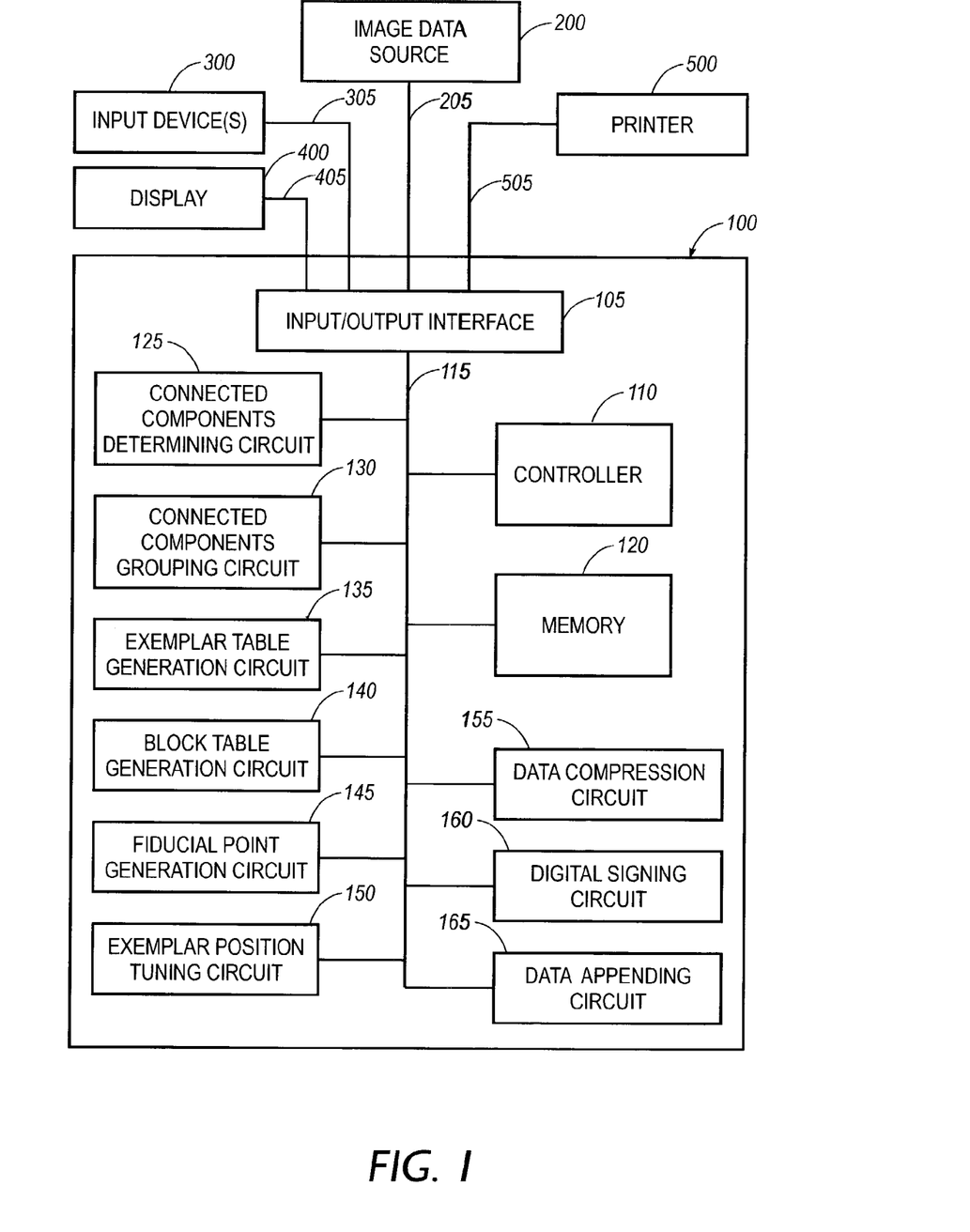
FIG. 1 is a block diagram of one exemplary embodiment of a document authentication device according to this invention.

FIG. 1 shows one exemplary embodiment of a document authentication device 100 implementing one exemplary embodiment of the systems and methods for document authentication according to this invention. As shown in FIG. 1, the document authentication device 100 includes an input/output interface 105, a controller 110, a memory 120, a connected components determining circuit, routine or manager 125, a CC grouping circuit, routine or manager 130, a exemplar table generation circuit, routine or manager 135, a block table generation circuit, routine or manager 140, a fiducial point generation circuit, routine or manager 145, a position tuning circuit, routine or manager 150, a data compression circuit, routine or manager 155, a digital signing circuit, routine or manager 160, and a data appending circuit, routine or manager 165, each connected to a signal/data bus 115.

As shown in FIG. 1, an image data source 200, one or more input devices 300, a display 400 and a printer 500 are connected to the input/output interface 105 of the document authentication device 100 over links 205, 305, 405 and 505, respectively.

In general, the image data source 200 can be any one of a number of different sources, such as a scanner, a digital copier, a facsimile device that is suitable for generating electronic image data, or a device suitable for storing and/or transmitting electronic image data, such as a client or server of a network, or the Internet, and especially the World Wide Web. For example, the image data source 200 may be a scanner, or a data carrier such as a magnetic storage disk, CD-ROM or the like, or a host computer, that contains scanned image data. Thus, the image data source 200 can be any known or later developed source that is capable of providing image data to the document authentication device 100 of this invention.

The image data source 200 can be integrated with the document authentication device 100, as a digital copier having an integrated scanner. Alternatively, the image data source 200 can be connected to the document authentication device 100 over a connection device, such as a modem, a local area network, a wide area network, and intranet, the Internet, any other distributed processing network, or any other known or later developed connection device.

The links 205, 305, 405 and SOS can each be any known or later developed device or system for connecting the respective devices 200, 300, 400 and 500 to the document authentication device 100, including a direct cable connection, a connection over a wide area network or a local area network, a connection over an intranet, a connection over the Internet, or a connection over any other distributed processing network or system. In general, the links can be any known or later developed connection systems or structure usable to connect the respective devices to the document authentication device 100.

The one or more input devices 300 may be any combination of one or more standard input devices, such as a keyboard, a mouse, a joystick, a trackball, a touch pad, a touch button(s), a pen-based system, a microphone and associated voice recognition software, a sensor, an optical sensor or any other known or later developed device for inputting user commands to the document authentication device 100. The display 400 can be a monitor or any other known or later developed device that is capable of displaying an electronic version of the resulting document image for viewing or of displaying information about any other intermediary steps of the document authentication process. It should be appreciated that the display 400 is optional. The printer 500 can be any known or later developed image forming device that is capable of printing a hard copy of an image.

It should be appreciated that the image data source 200, the one or more input devices 300, the display 400, and the printer 500 do not have to be locally associated with the document authentication device 100. Furthermore, it should be appreciated that document authentication device 100, image data source 200, input device 300, display 400 and printer 500 can be elements integrated into a single device, such as a digital photocopier or the like. Furthermore, it should also be appreciated that any number of these devices 100, 200, 300, 400 and 500 may be integrated into a single device to cooperate with the remaining devices.

As shown in FIG. 1, the memory 120 can be implemented using any appropriate combination of alterable, volatile, or non-volatile memory or non-alterable, or fixed memory. The alterable memory, whether volatile, or non-volatile, can be implemented using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

Further, it should be appreciated that the data bus 115 connecting the memory 120 to the input/output interface 105 can be a wired or wireless link to a network (not shown). The network can be a local area network, a wide area network, and intranet, the Internet, or any other distributed processing and storage network.

The document authentication device 100 can be implemented as software executing on a programmed general purpose computer, a special purpose computer, a microprocessor or the like. Alternatively, the document authentication device 100 can be implemented as a routine embedded in a printer driver, as a resource residing on a server, or the like. The document authentication device 100 can also be implemented by physically incorporating it into a software and/or hardware system, such as the hardware and software system of a printer or a digital photocopier.

It should also be understood that each of the circuits, routines or managers shown in FIG. 1 can be implemented as portions of a suitably programmed general purpose computer. Alternatively, each of the circuits, routines or managers shown in FIG. 1 can be implemented as physically distinct hardware circuits, routines or managers within an ASIC, or using a FPGA, a PDL, a PLA or a PAL, or using discrete logic elements or discrete circuit, routine or manager elements. The particular form each of the circuits, routines or managers shown in FIG. 1 will take as a design choice and will be obvious and predicable to those skilled in the art.

In operation, using the one or more input devices 300, the sender instructs the authentication device 100, over the link 305, to notarize a document. Document image data of a document is received from the image data source 200, over the link 205, by the input/output interface 105 of the document authentication device 100. The input/output interface 105 forwards the input document image data, under direction of the controller 110, to the memory 120.

The connected components determining circuit, routine or manager 125 retrieves the document image data from the memory 120 and analyzes the image data to determine connected components. In various exemplary embodiments, connected components consist of a set of pixels that when taken together often resemble recognizable characters. In various exemplary embodiments, the connected components determining circuit, routine or manager 125 utilizes known or later developed methods of determining connected components, such as for example, but not limited to, the methods disclosed in for example "Digital Image Processing" by Rafael C. Ganzalez and Richard E. Woods, Addison-Wesley, 1993, which is incorporated herein in its entirety by reference. The connected components are stored in the memory 120 under control of the controller 110. Alternatively, the connected components determining circuit, routine or manager 125 outputs the connected components to the connected components grouping circuit, routine or manager 130, the exemplar table generating circuit, routine or manager 135, the position block generation circuit, routine or manager 140, the fiducial point generation circuit, routine or manager 145, and/or the position tuning circuit, routine or manager 150.

The connected components grouping circuit, routine or manager 130 retrieves the connected components and groups the connected components, generates an exemplar for each group and outputs an exemplar list to the memory 120 under control of the controller 110. Alternatively, the connected components grouping circuit, routine or manager 130 outputs the exemplar list to the exemplar table generating circuit, routine or manager 135, and/or the fiducial point generation circuit, routine or manager 145. Each exemplar represents a group of connected components that are similar in appearance. In various exemplary embodiments, the connected components grouping circuit, routine or manager 130 utilizes known or later developed methods of grouping the connected components, such as for example, but not limited to the methods and techniques disclosed in U.S. Pat. No. 5,835,638 to Rucklidge et al. (hereinafter the '638 patent), which is incorporated herein in its entirety.

The exemplar table generating circuit, routine or manager 135 retrieves the exemplar list and the connected components. In various exemplary embodiments, for each exemplar in the exemplar list, the exemplar table generating circuit, routine or manager 135 determines the X and Y positions of the first occurrence in the image data, and the height and width of the exemplar to generate a exemplar table. The exemplar table is stored in the memory 120 under control of the controller 110. Alternatively, the exemplar table generating circuit, routine or manager 135 outputs the exemplar table to the fiducial point generation circuit, routine or manager 145, the position tuning circuit, routine or manager 150 and/or the data compression circuit, routine or manager 155.

The block table generation circuit, routine or manager 140 retrieves the connected components, determines each block of connected components and identifies the position of each occurrence for each of the exemplars in each block. In various exemplary embodiments, a block generally corresponds to a single line of text in the document. In various exemplary embodiments, for each block, the block table circuit, routine or manager 140 also creates a list of the original connected components that are within each block. The block table and the list of original connected components in each block are stored in the memory 120 under control of the controller 110. Alternatively, the block table generation circuit, routine or manager 140 outputs the block table to the position tuning circuit, routine or manager 150 and/or the data compression circuit, routine or manager 155.

The fiducial point generation circuit, routine or manager 145 retrieves the exemplar list, the exemplar table and the connected components and based on these items generates a fiducial point for each exemplar. A fiducial point identifies where a exemplar, on average, crosses a baseline for a block. The fiducial points are added to the exemplar table, which is stored in the memory 120 under control of the controller 110.

The position tuning circuit, routine or manager 150 retrieves the block table, the exemplar table and the list of connected components in each block. The position tuning circuit, routine or manager 150 compares the placement of each connected component based on the block table and the exemplar table to the list of original connected components for each block. For any discrepancies found, position tuning commands are added to the block table for each appropriate exemplar under control of the controller 110.

The data compression circuit, routine or manager 155 receives and compresses the exemplar table and the block table to create a compressed document data file that is stored in the memory 120 under control of the controller 110. Alternatively, the data compression circuit, routine or manager 155 outputs the block table to the digital signing circuit, routine or manager 160, and/or the data appending circuit, routine or manager 165.

The digital signing circuit, routine or manager 160 receives the document data file and uses conventional or later developed techniques to digitally sign the document data file. It should be appreciated that the digital signing circuit, routine or manager 160 provides further security to the authenticated document, but it is optional. The digitally signed document data file is stored in the memory 120. Alternatively, the digital signing circuit, routine or manager 160 outputs the digitally signed document data file to the data appending circuit, routine or manager 165.

The data appending circuit, routine or manager 165 receives and converts the document data file or the digitally signed document data file into a format, such as but not limited to data glyphs or 2D bar codes, that is machine readable and outputs the reformatted document data file, to the memory 120 and the input/output interface 105 under control of the controller 110. Exemplary data glyphs are disclosed in U.S. Pat. Nos. 5,168,147, 5,245,165 and 5,572,010 all of which are incorporated in their entireties herein by reference. The reformatted document data file is then sent over the link 505 to the printer 500 and/or to the display 400 over the link 405 under control of the controller 110.

An authenticated document, i.e., a document image data file having document data file appended to it, is sent to a receiver who will then generate a verification document image based on the document data file. The receiver will then compare the reconstructed verification document image to the received document image to determine if any alterations have been made to the received document after the document data file was appended.

Figure 2:
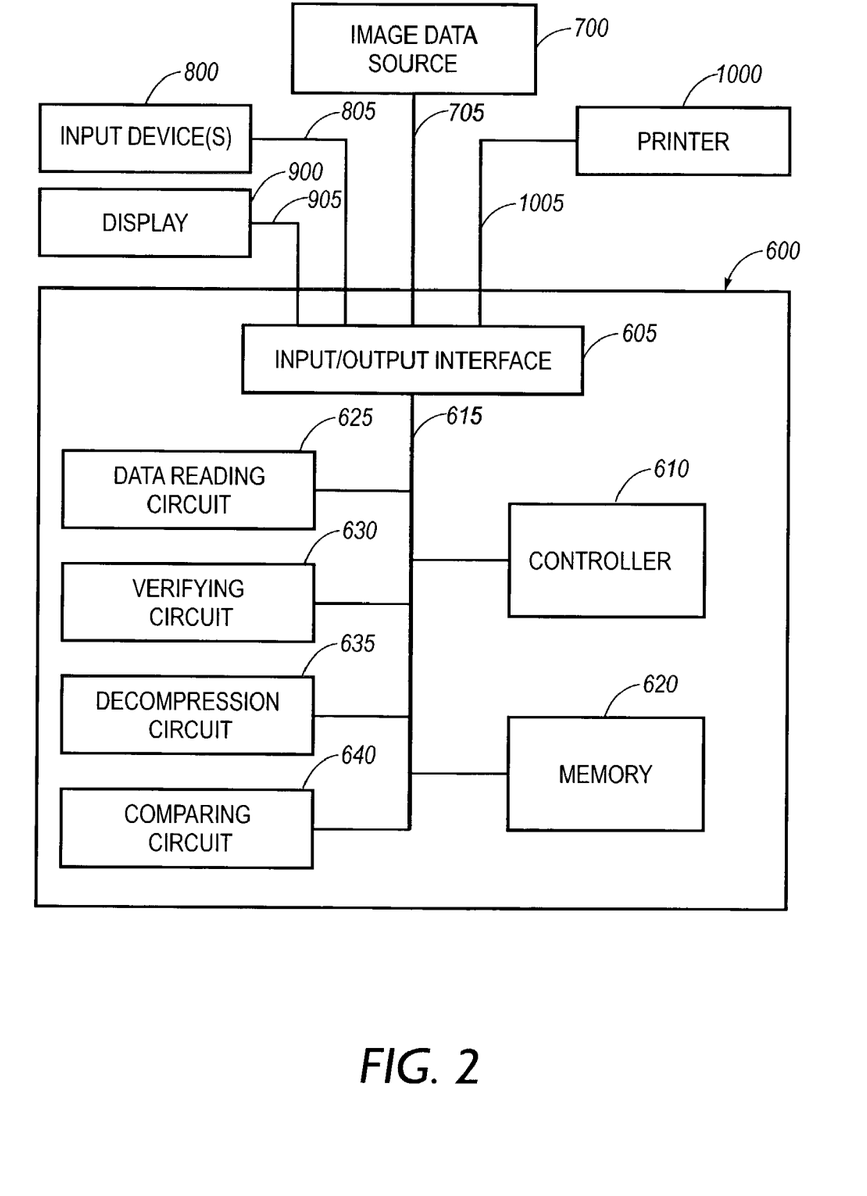
FIG. 2 is a block diagram of one exemplary embodiment of a document verification device according to this invention.

FIG. 2 shows one exemplary embodiment of a document verification device 600 implementing one exemplary embodiment of the systems and methods for document verification according to this invention. As shown in FIG. 2, the document verification device 600 includes an input/output interface 605, a controller 610, a memory 620, a data reading circuit, routine or manager 625, a verifying circuit, routine or manager 630, a decompression circuit, routine or manager 635 and a comparing circuit 640, each connected to a signal/data bus 615.

As shown in FIG. 2, an image data source 700, one or more input devices 800, a display 900 and a printer 1000 are connected to the input/output interface 605 of the document verification device 600 over links 705, 805, 905 and 1005, respectively.

In general, the image data source 700 can be any one of a number of different sources, such as a scanner, a digital copier, a facsimile device that is suitable for generating electronic image data, or a device suitable for storing and/or transmitting electronic image data, such as a client or server of a network, or the Internet, and especially the World Wide Web. For example, the image data source 200 may be a scanner, or a data carrier such as a magnetic storage disk, CD-ROM or the like, or a host computer, that contains scanned image data. Thus, the image data source 700 can be any known or later developed source that is capable of providing image data to the document verification device 600 of this invention.

The image data source 700 can be integrated with the document verification device 600, as a digital copier having an integrated scanner. Alternatively, the image data source 700 can be connected to the document verification device 600 over a connection device, such as a modem, a local area network, a wide area network, and intranet, the Internet, any other distributed processing network, or any other known or later developed connection device.

The links 705, 805, 905 and 1005 can each be any known or later developed device or system for connecting the respective devices 700, 800, 900 and 1000 to the document verification device 600, including a direct cable connection, a connection over a wide area network or a local area network, a connection over an intranet, a connection over the Internet, or a connection over any other distributed processing network or system. In general, the links can be any known or later developed connection systems or structure usable to connect the respective devices to the document verification device 600.

The one or more input devices 800 may be any combination of one or more standard input devices, such as a keyboard, a mouse, a joystick, a track ball, a touch pad, a touch button(s), a pen-based system, a microphone and associated voice recognition software, a sensor, an optical sensor or any other known or later developed device for inputting user commands to the document verification device 600. The display 900 can be a monitor or any other known or later developed device that is capable of displaying an electronic version of the resulting document image for viewing or of displaying information about any other intermediary steps of the document verification process. It should be appreciated that the display 900 is optional. The printer 1000 can be any known or later developed image forming device that is capable of printing a hard copy of an image.

It should be appreciated that the image data source 700, the one or more input devices 800, the display 900, and the printer 1000 do not have to be locally associated with the document verification device 600. Furthermore, it should be appreciated that document verification device 600, image data source 700, input device 800, display 900 and printer 1000 can be elements integrated into a single device, such as a digital photocopier or the like. Furthermore, it should also be appreciated that any number of these devices 600, 700, 800, 900 and 1000 may be integrated into a single device to cooperate with the remaining devices.

As shown in FIG. 2, the memory 620 can be implemented using any appropriate combination of alterable, volatile, or non-volatile memory or non-alterable, or fixed memory. The alterable memory, whether volatile, or non-volatile, can be implemented using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

Further, it should be appreciated that the data bus 615 connecting the memory 620 to the input/output interface 605 can be a wired or wireless link to a network (not shown). The network can be a local area network, a wide area network, and intranet, the Internet, or any other distributed processing and storage network.

The document verification device 600 can be implemented as software executing on a programmed general purpose computer, a special purpose computer, a microprocessor or the like. Alternatively, the document verification device 600 can be implemented as a routine embedded in a printer driver, as a resource residing on a server, or the like. The document verification device 600 can also be implemented by physically incorporating it into a software and/or hardware system, such as the hardware and software system of a printer or a digital photocopier.

It should also be understood that each of the circuits, routines or managers shown in FIG. 2 can be implemented as portions of a suitably programmed general purpose computer. Alternatively, each of the circuits, routines or managers shown in FIG. 2 can be implemented as physically distinct hardware circuits, routines or managers within an ASIC, or using a FPGA, a PDL, a PLA or a PAL, or using discrete logic elements or discrete circuit, routine or manager elements. The particular form each of the circuits, routines or managers shown in FIG. 2 will take as a design choice and will be obvious and predicable to those skilled in the art.

In operation, using the one or more input devices 800, the receiver instructs the verification device 600, over the link 805, to determine whether a document having a document data file from a sender is genuine. Document image data of the document is received from the image data source 700, over the link 705, by the input/output interface 605 of the document verification device 600. The input/output interface 605 forwards the input document image data, under direction of the controller 610, to the memory 620.

The data reading circuit, routine or manager 625 reads the document data file that was appended to the document by the sender, converts the information contained therein into a format understandable by the document verification device 600 and outputs the document information to the memory 620 under the control of the controller 610. In various other exemplary embodiments, the data reading circuit outputs the information the other circuits, routines and managers of the document verification device 600 under the control of the controller 610. In various exemplary embodiments, the document information from the document data file includes an exemplar table and a block table. In various exemplary embodiments the document information includes a digital signature. The data reading circuit, routine or manager 630 uses conventional or later developed methods and techniques to read the document data file. In various exemplary embodiments, the data reading circuit reads data glyphs.

The verifying circuit, routine or manager 630 retrieves the digital signature from the document information and analyzes the digital signature to verify the digital signature to ensure that the document is from the sender. The verifying circuit, routine or manager 630 uses convention or later developed methods, techniques and devices to verify the digital signature. If the signature is not verified, the verifying circuit, routine or manager 630 outputs to the printer 1000 and/or the display 900 via the input/output interface and under the control of the controller 610, that the document is not genuine. If the signature is verified, then the verifying process is allowed to continue. It should be understood that in various exemplary embodiments, the verifying circuit, routine or manager 630 is not necessary and is optional when the sender does not digitally sign the document data file that is appended to the document.

The decompression circuit, routine or manager 635 constructs a verifying document image using the exemplar table and the block table from the document data file. The decompression circuit, routine or manager 635 uses the data within the exemplar table and the block table to determine how to reconstruct the document. In various exemplary embodiments, the decompression circuit, routine or manager 635 decodes any information that was coded or compressed by the sender. The decompression circuit, routine or manager 635 outputs the reconstructed document image data to memory under the control of the controller 610. In various other exemplary embodiments, the decompression circuit, routine or manager 635 outputs the reconstructed document image data to the comparing circuit, routine or manager 640 under the control of the controller 610. In various other exemplary embodiments, the decompression circuit, routine or manager 635 outputs the reconstructed document image data under the control of the controller 610 to the printer 1000 via the link 10005 and/or the display 900 via the link 905.

The comparing circuit, routine or manager 640 retrieves the verifying document image (i.e. the reconstructed document image data) and the document image data and then compares the reconstructed document image data to the document image data. If there are any discrepancies between the reconstructed document image data and the document image data then it is determined that the document is not genuine. Otherwise, it is determined that the document is genuine. In various exemplary embodiments, the results of the comparison are outputted under the control of the controller 610 to the display 900 via the link 905. In various other exemplary embodiments the results of the comparison are outputted under the control of the controller to the memory 620, and or the printer 1000 via the link 1005. It should be understood, that the comparing circuit, routine or manager 640, in various exemplary embodiments, is not necessary and is optional when the comparison is to be conducted manually by a user.

Figure 3:
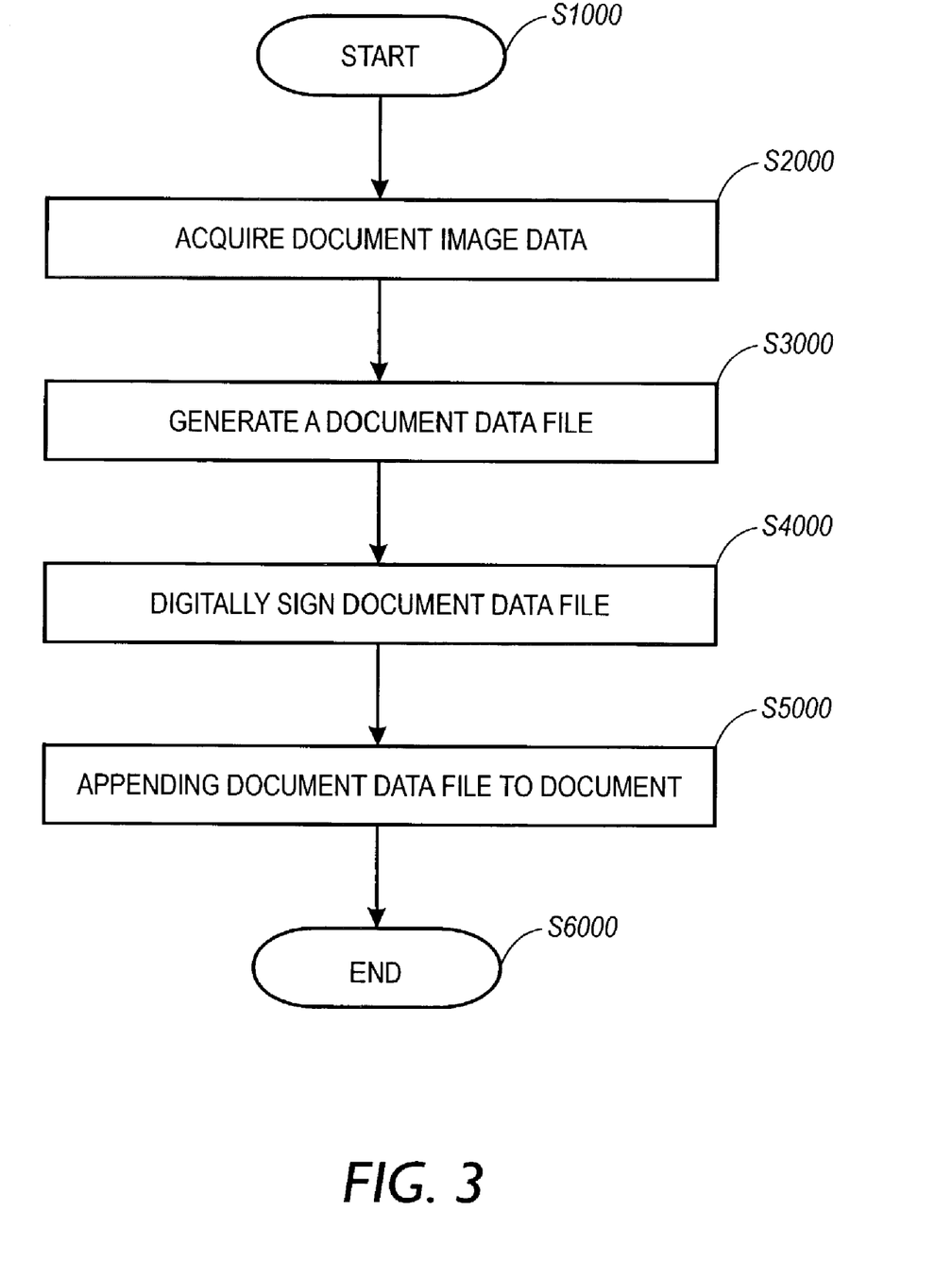
FIG. 3 is a flowchart outlining one exemplary embodiment of a method for authenticating a document according to this invention.

FIG. 3 is a flowchart outlining one exemplary embodiment of a method for authenticating a document according to this invention. Control begins in step S1000 and continues to step S2000, where document image data is acquired. Next, in step S3000, a document data file is generated. An exemplary embodiment of step S3000 is displayed in FIG. 5, which is discussed further below.

Then, in step S4000, the document data file is digitally signed. It should be appreciated that step S4000 is optional and is added as a way to add further security to the document. Control then continues to step S5000.

In step 55000, the document data file is then appended to the original document. The document data file may be appended in any conventional form such as data glyphs or a 2D bar code, or the like, or any later developed technique. Then, in step S6000, the data authentication process ends.

Figure 4:
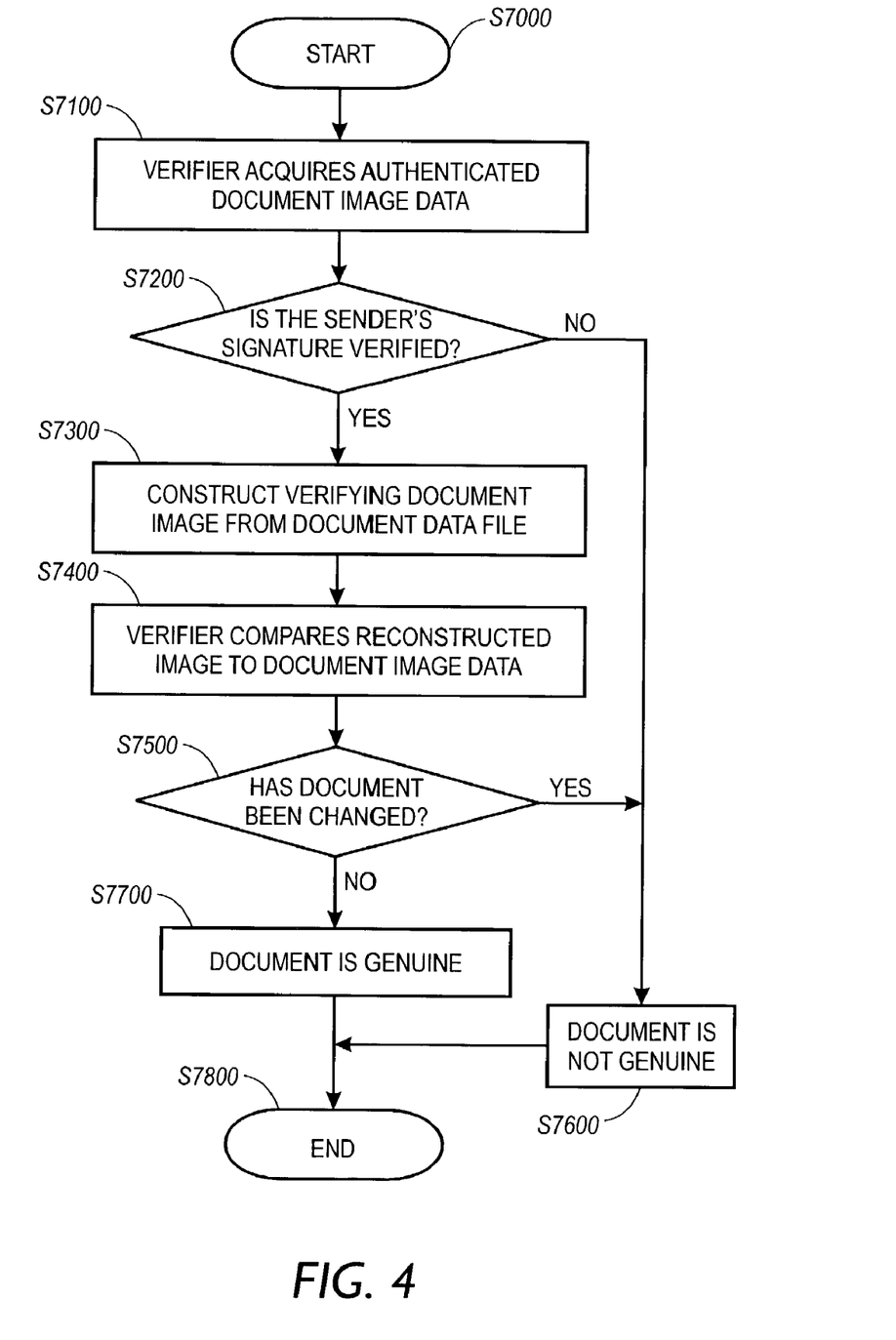
FIG. 4 is a flowchart outlining one exemplary embodiment of a method for verifying a document according to this invention.

FIG. 4 is a flowchart outlining one exemplary embodiment of a method for verifying the authenticity of a document authenticated according to this invention. Beginning in step S7000, control continues to step S7100, where an authenticated document image data is input. In step S7200, a determination is made whether the digital signature is verified, using conventional or later developed digital signature techniques. If the signature is not verified, i.e. it is not from the sender, control jumps to step S7600. Otherwise, if the signature is verified, control proceeds to step S7300. It should be understood that step S7200 will be unnecessary if the document has not been digitally signed.

In step S7300, a verifying document image is constructed from the document data file appended to the document. Then, in step S7400, the verifying document image is compared to the input document image data. Next, in step S7500, a determination is made whether the input document is more or less identical to the verifying image. If not, control continues to step S7600. In contrast, if the input document is more or less identical to the verifying image, control proceeds to step S7700.

In step S7700, the document is identified as genuine. Control then proceeds to step S7800. In contrast, in step S7800, the document is identified as not being genuine. Control then jumps to step S7800, where the verification process ends.

Figure 5:
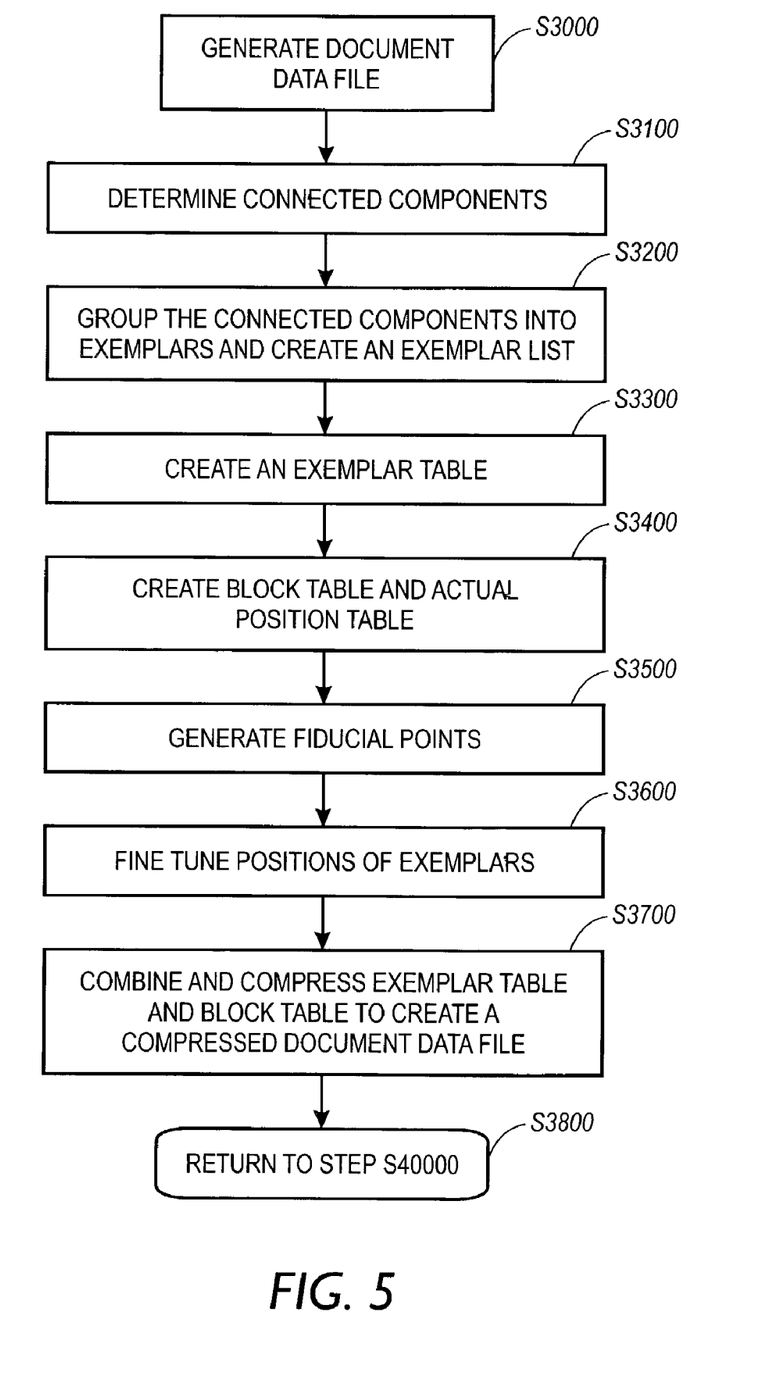
FIG. 5 is a flowchart outlining one exemplary embodiment of a method for generating a document data file according to this invention.

FIG. 5 is a flowchart outlining one exemplary embodiment of the method for generating a document data file of step S3000. The document data file comprises two parts. The first part is a exemplar table and the second is block table.

For clarity, the exemplar table may be thought of as a table that includes a listing of exemplar reference numbers with associated pointers for at least one exemplar for each connected component displayed on the document. Associated with each pointer are the x and y positions of the lower left corner of that exemplar's first occurrence on the page, the width and height in pixels of that exemplar, and the Y offset relative to the lower left corner of a fiducial point. A fiducial point is determined as to where the text baseline of a block should cross the exemplar. The block table includes a listing of the position of each block of the document along with the associated exemplar reference numbers associated with that exemplars that appear in that block and any fine tuning instructions associated with each respective exemplar in that block.

In other various exemplary embodiments, the pointers in the exemplar table point to more than one connected component of that exemplar. This would provide additional security at the expense of increasing the size of the document data file. In other various exemplary embodiments, the pointers in the exemplar table point to a connected component other than the first occurrence of that exemplar.

As shown in FIG. 5, to generate a document data file control begins in step S3000 and continues to step S3100, where connected components are determined. The connected components are determined using conventional methods from the document image data. Then, in step S3200, the connected components are grouped by similarity, an exemplar is chosen for each group and an exemplar list is created. Determining and grouping of the connected components is completed by using conventional methods, such as those disclosed in the '638 patent, the '864 patent and the '304 patent. The connected components are grouped together as to their appearance. Next, in step S3300, once a exemplar list has been created, a exemplar table is created. One exemplary embodiment of step S3300 is displayed in FIG. 6, which is discussed further below. Control then continues to step S3400.

In step S3400, the block table is created. One exemplary embodiment of step S3400 is displayed in FIG. 7, which is discussed further below.

In step S3500, fiducial points are generated. One exemplary embodiment of step S3500 is displayed in FIG. 8, which is discussed further below.

In step S3600, the positions of the respective exemplars are fine tuned. One exemplary embodiment of step S3600 is displayed in FIG. 9, which is discussed further below. Control then continues to step S3700.

In step S3700, the exemplar table and the block table are combined and compressed to create a compressed document data file. In various exemplary embodiment the values associated with the data for each exemplar are delta-encoded. Delta encoding represents the values by the difference between each value and the previous one. In various exemplary embodiments, the delta encoded values are further encoded by a variable byte scheme. The variable byte scheme sends numbers in the range [−63, 63] in a single byte. The most significant bit is 0 to indicate only a one byte number and the next most significant bit gives the sign of the number. For numbers greater than 63 or lesser than −63, the variable byte scheme sends the value in two bytes. The most significant bit is one and the next bit gives the sign. Numbers never exceed $2^{14}$ so two bytes should suffice. In various exemplary embodiments, the delta encoded values in the exemplar table are further compressed by using gzip. Gzip is a standard UNIX based compression program that uses a Lempel-Ziv compressing technique. It should be appreciated that other conventional or later developed compression techniques may be used.

The block table is compressed differently from the exemplar table. The x positions are the lower left hand corners of the blocks and are encoded by the following method. The difference between the x and the closest of the last three x's is computed. If the absolute value of this difference is less than 32, then one byte specifies all the information for this x: two bits (00, 01, or 10) for which of the last three is closest, a sign bit for the difference, and five bits for the absolute value of the difference. "11" in the leading two bits indicates that the absolute value of the difference exceeded 31; in this case two bytes (the next 14 bits) are used to encode the x value itself. This method exploits multi-column page layouts, in which most blocks share an X position with some previous block, although not necessarily with the immediately previous block.

The y positions of the lower left corners of the blocks are delta-encoded and then written out using the variable byte scheme described above.

In various exemplary embodiments, the encoded x and y start positions of the blocks are then sent through gzip to accomplish a compression rate of about 10% to 20%.

Then, in step S3800, control returns to step S4000.

Figure 6:
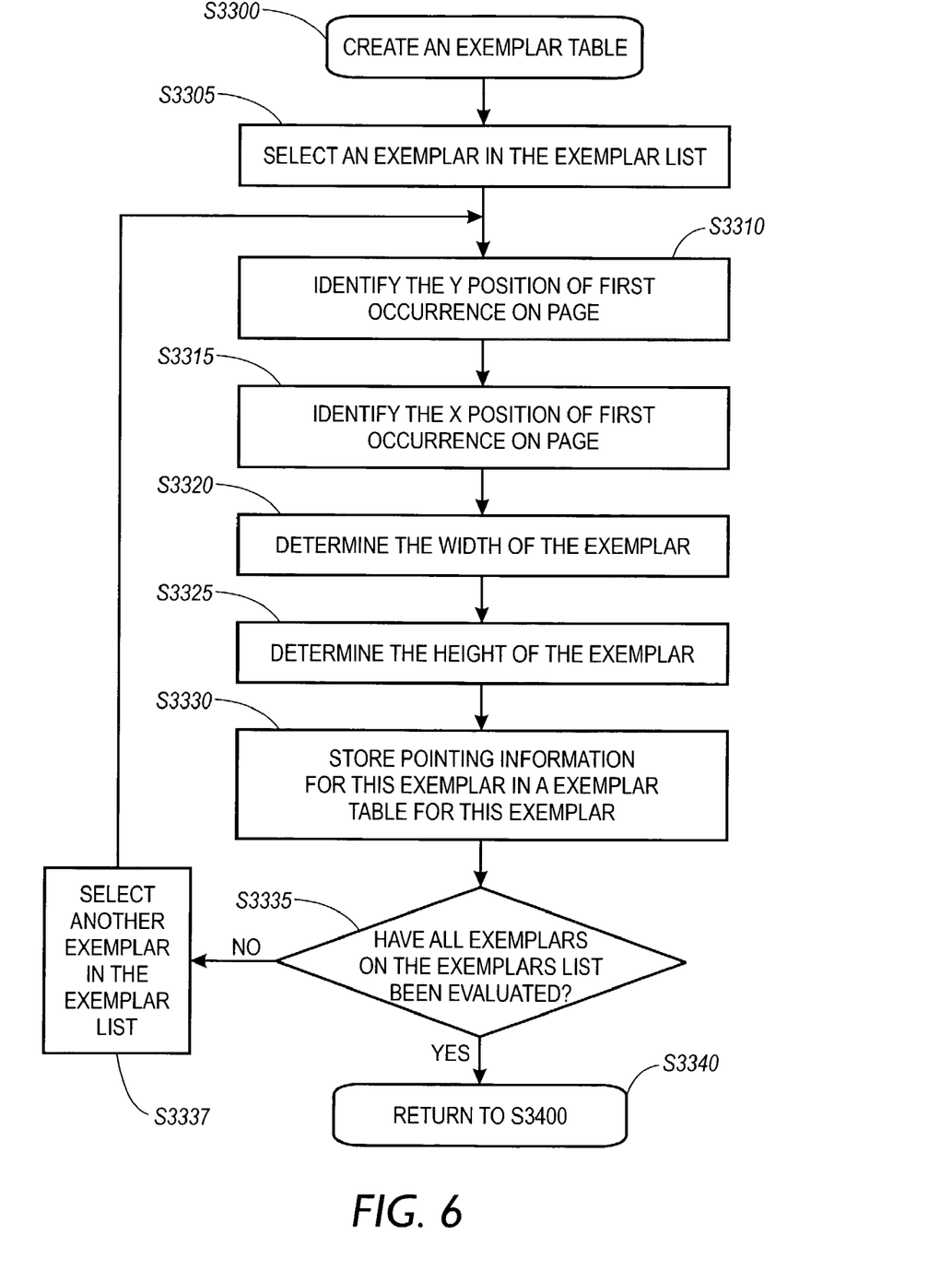
FIG. 6 is a flowchart outlining one exemplary embodiment of a method for creating a exemplar table for exemplars according to this invention.

FIG. 6 is a flowchart outlining one exemplary embodiment of the method for creating a pointer/position index for exemplars of step S3300. Beginning in step S3300, control continues to step S3305, where a exemplar in the exemplar list is selected. In various exemplary embodiments the exemplar selected in step S3305 is the first listed exemplar in the exemplar list. Then, in step S3310, the Y position of the first occurrence on the page of that exemplar is identified. Next, in step S3315, the X position of the first occurrence on the page of that exemplar is identified. Control then continues to step S3320.

In step S3320, the width of the particular exemplar is determined. Next, in step S3325, the height of the particular of the exemplar is determined. Then, in step S3330, the X and Y positions and the width and height of the exemplar are stored in a exemplar table for the exemplar. In various exemplary embodiments, the height and width of each exemplar are measured in pixels. Control then continues to step S3335.

In step S3335, a determination is made whether all the exemplars have been evaluated. If not, control proceeds to step S3337, where another exemplar is selected from the exemplar list. Control then proceeds to step S3310 through S3330. Once step S3335 determines that all the exemplars have been evaluated, control proceeds to step S3340, where control returns to step S3400.

Figure 7:
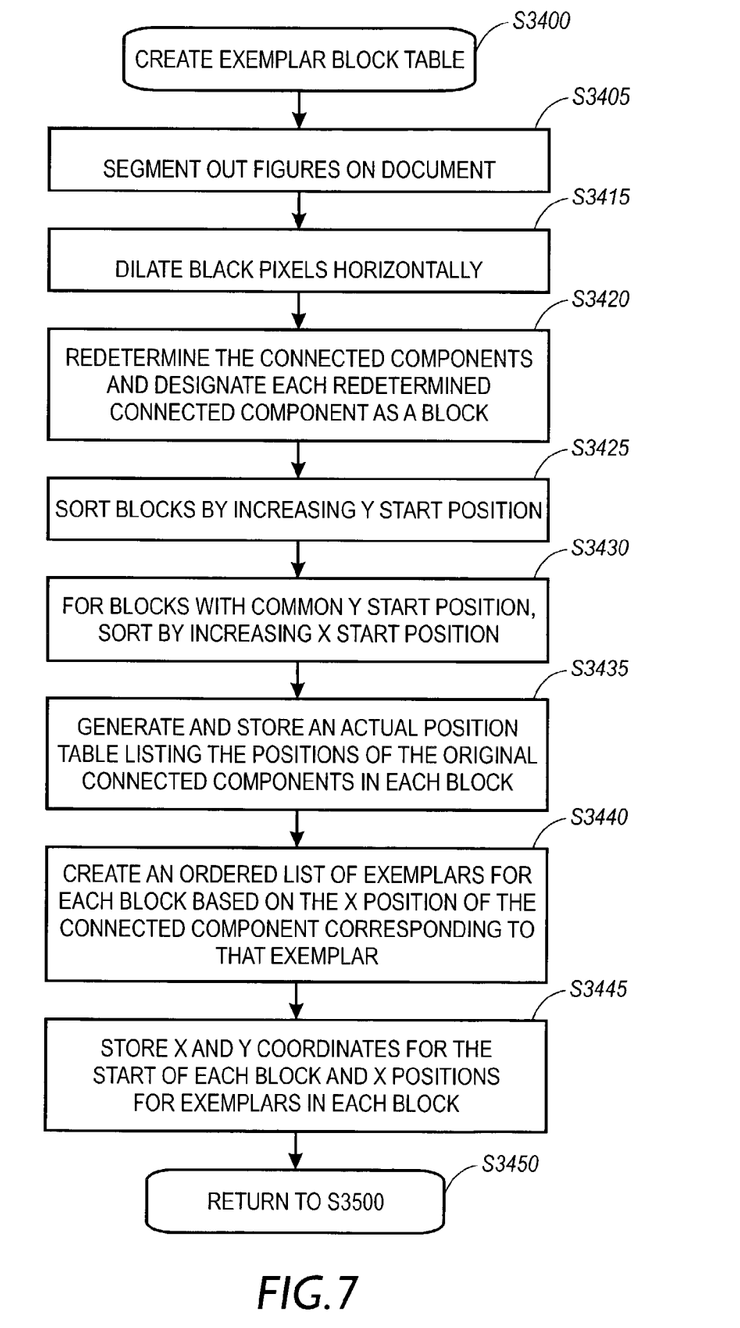
FIG. 7 is a flowchart outlining one exemplary embodiment of a method for creating block table for exemplars according to this invention.

FIG. 7 is a flowchart of one exemplary embodiment of the method of creating a block table of step S3400. Beginning in step S3400, control proceeds to step to S3405, where the connected components that make-up figures, pictures or the like that are on the original document are segmented out. In various exemplary embodiments, the connected components that make-up the figures are segmented by dilating black pixels by a small amount. In various exemplary embodiments, this small amount is about five pixels in each direction of the black pixel. Then, all tall connected components are removed. In various exemplary embodiments, a connected component is considered tall if it is about 200 pixels high.

Next, in step S3415, the black pixels are dilated horizontally by a large amount. The dilation blackens each pixel that has a black pixel no more than a certain distance away to the right or left. In various exemplary embodiments, this large amount or distance is about 18 pixels. This dilation step is conducted on the original obtained image data with the figures and pictures taken out. Control then proceeds to step S3420.

In step S3420, re-determined connected components are determined based on the black pixels that have been dilated horizontally by a large amount and the re-determined connected components are designated as blocks. In various exemplary embodiments, the blocks may be shorter than true text lines as found on a document. Next, in step S3425, the blocks are then sorted by increasing y start positions. Then, in step S3430, blocks having common y start positions are sorted by increasing x start positions. Control then proceeds to step S3435.

In step S3435, a list of the positions of the original connected components found in each block is generated and stored in an actual position table.

Then, in step S3440, an ordered list of the exemplars for each block is created, based on the x position of the connected component corresponding to that exemplar. Next, in step S3445, the x and y coordinates for the start of each block and the positions for the exemplars in each block are stored, thus creating the exemplar position block for each block. Then, in step S3450, control returns to step S3500.

Figure 8:
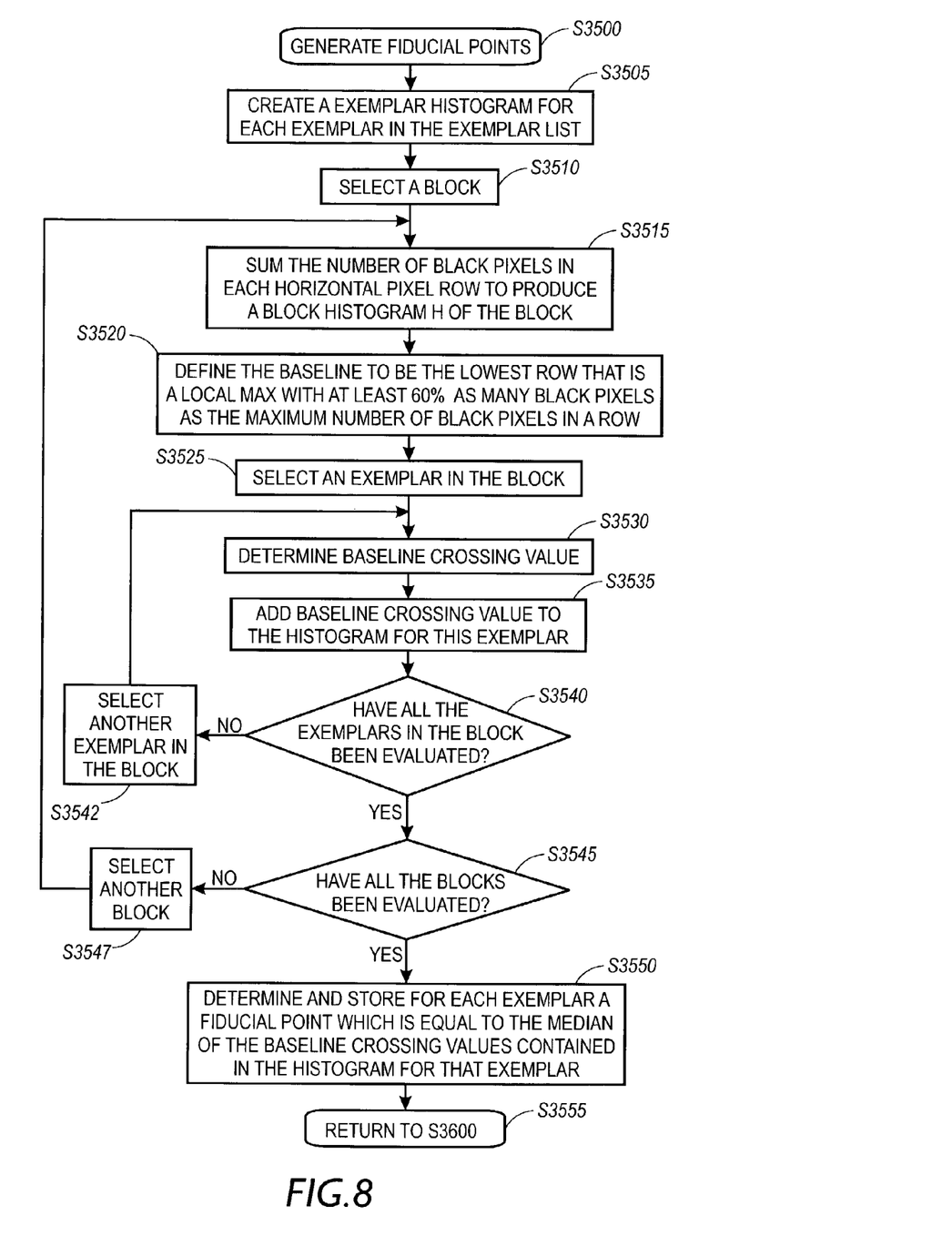
FIG. 8 is a flowchart outlining one exemplary embodiment of a method for generating fiducial points according to this invention.

FIG. 8 is a flowchart of an exemplary embodiment of the method for generating fiducial points of step S3500. Control proceeds from step S3500 to step S3505 where an empty exemplar histogram for each exemplar in the exemplar list is created. Control then proceeds to step S3510 where a block is selected. In various exemplary embodiments the block selected in step S3510 is the first or the upper-most block. In step S3515 the number of black pixels in each horizontal pixel row is summed to produce a block histogram H of the block. Then in step S3520 a baseline is defined. In various exemplary embodiments, the baseline is the lowest row whose number of black pixels is a local maximum and the value of that local maximum is at least 60% as many as the maximum number of black pixels in any row.

In step S3525 the next exemplar in the block is selected. Then in step S3530 a baseline crossing value for that exemplar is determined. The baseline crossing value is the distance the exemplar extends below the baseline, namely the distance from the baseline to the bottom of the bounding box for the exemplar. In step S3535 the baseline crossing value determined in step S3530 is added to the histogram for the particular exemplar.

In step S3540 it is determined whether all the exemplars in the block have been evaluated. If not, control proceeds to step S3542 where another exemplar in the block is selected. Control then proceeds to steps S3520 through S3535. Once step S3540 determines that all exemplars in the block have been evaluated, then control proceeds to step S3545.

In step S3545 it is determined whether the block being evaluated is the last block on a document. If it is not the last block then control proceeds to step S3547 where another block is selected. Control proceeds to steps S3515 through S3540. Once step S3545 determines that all the blocks have been evaluated, control proceeds to step S3550.

In step S3550 a fiducial point is determined for each exemplar. The fiducial point is set to be equal to median of the baseline crossing values contained in the histogram for each exemplar. The fiducial points are also stored in the exemplar table.

Figure 9:
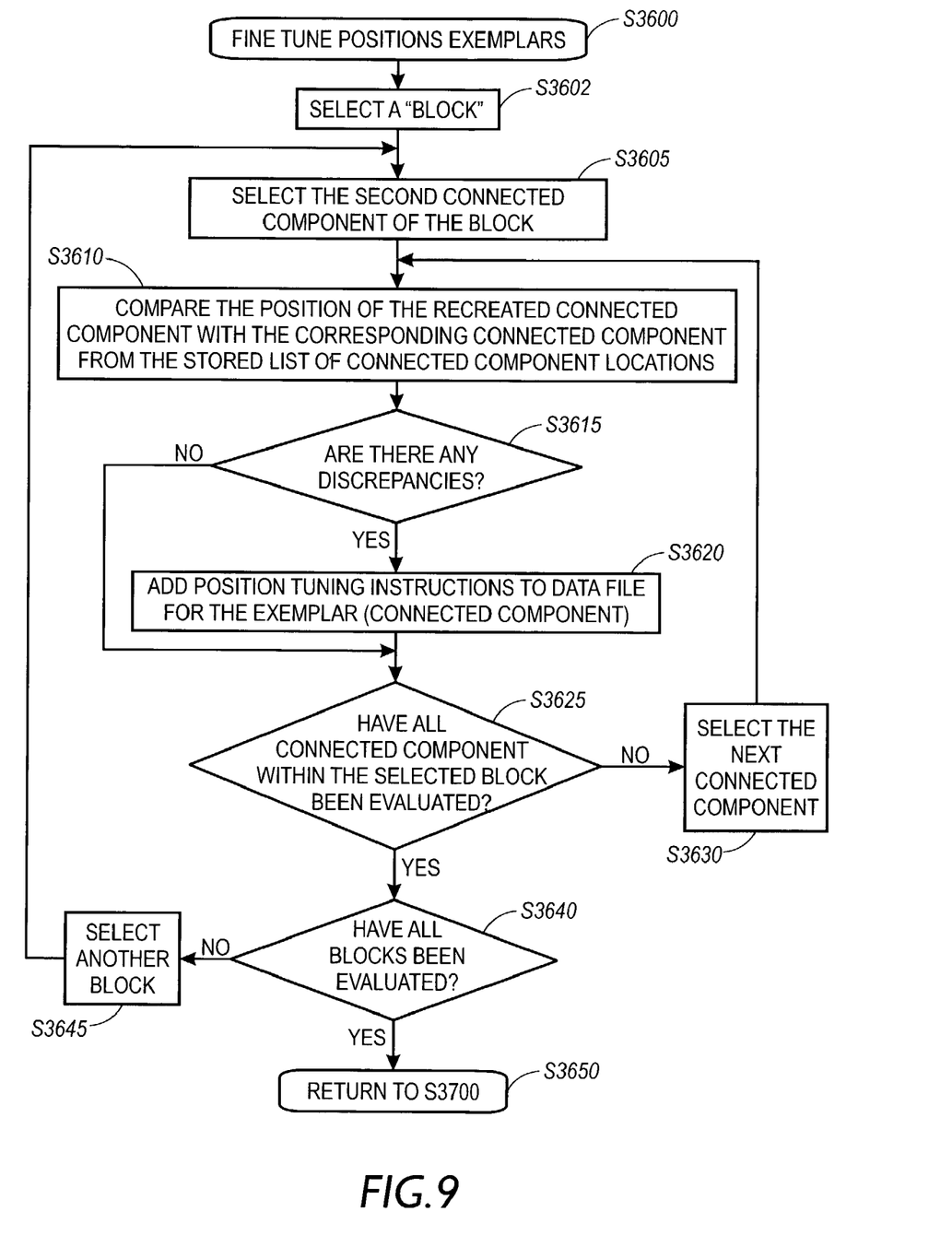
FIG. 9 is a flowchart outlining one exemplary embodiment of a method for fine tuning positions of exemplars according to this invention.

FIG. 9 is a flowchart of one exemplary embodiment of a method of fine tuning positions of exemplars according to the present invention. The method begins with step S3600 and continues to step S3602 where a block is selected. In step 3605, the second connected component of the block is selected. In step S3610 a default position of the selected connected component is compared with the location of the corresponding connected component from the actual position table. In various exemplary embodiments, the default position is a 2 pixel spacing in an x-direction and a y positioning that aligns the fiducial point of the exemplar with the baseline for the selected block. In step S3615 it is determined whether there are any significant discrepancies between the default positioning of the connected components and the position of the corresponding connected component from the actual position table. In various exemplary embodiments, significant discrepancies are discrepancies of about 1 or 2 pixels. If there are no significant discrepancies control proceeds to step S3625. Otherwise, control proceeds to S3620. In step S3620 position tuning instruction/position commands are added to the block table for the applicable connected component/exemplar. The position commands are represented by pseudo exemplars.

In step S3625 it is determined if all the connected components within the selected block have been evaluated. If not, control proceeds to step S3630 where another connected component is recreated using the document data file. Control then proceeds to steps S3610 through 53620. Once step S3620 determines that all the connected components have been evaluated, then control proceeds to step S3640.

In step S3640, it is determined whether all of the blocks have been evaluated. If not, control proceeds to step S3645 where another block is selected. Control then proceeds to steps S3605 through S3635. Once step S3640 determines that all of the blocks have been evaluated, then control proceeds to step S3650, where control returns to step S3700.

Figure 10:
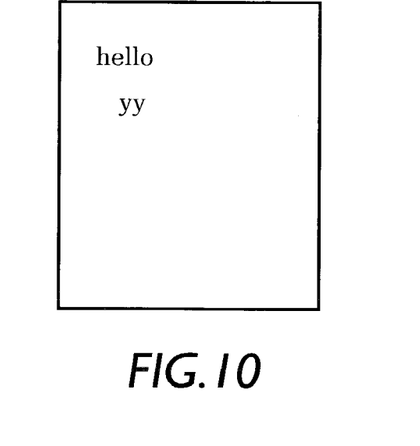
FIG. 10 is an illustration of a sample document to be authenticated.

FIG. 10 displays a sample document for purposes of illustrating a simple example. In FIG. 10, the sample document has the word, "hello" displayed in a first or top block and the letters "yy", separated by a space, displayed in a bottom or second block. This is a general example used only for exemplary purposes.

Figure 11:
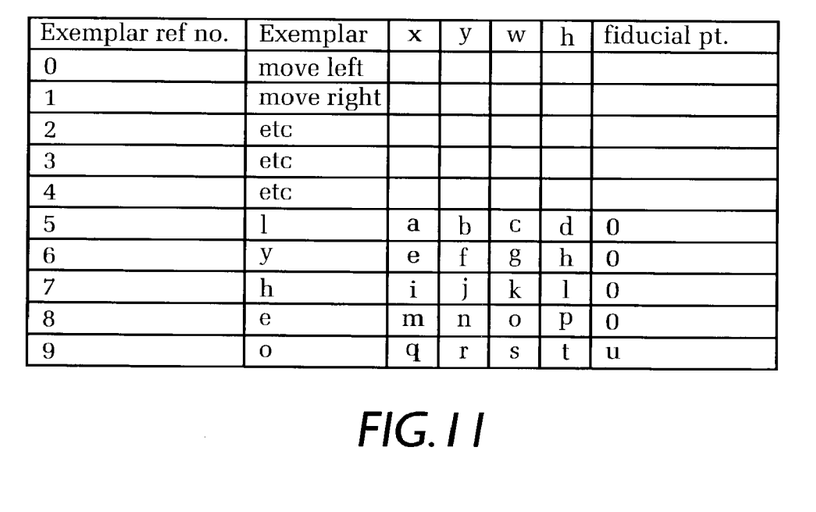
FIG. 11 is an illustration of a representing information that may be contained within a exemplar table for the sample document of FIG. 10, according to the present invention.

FIG. 11 shows a representative exemplar table for all the exemplars for the sample document displayed in FIG. 10. The exemplar table may be, for explanation purposes, thought of as a table that includes a column identifying exemplar numbers, a column identifying exemplars, a column for the x position of an exemplar for the exemplar, a column for the y position of the exemplar for the exemplar, a column for the height of the exemplar for the exemplar, a column for the width of the exemplar, and a column for the fiducial point for the exemplar. The exemplars are not actually stored in the exemplar table, but they are shown in the table for illustrative purposes only. For this example, there are rows 0–9, with rows 0–4 reserved for positioning instructions. Rows 5–9 identify the exemplars used in this example. It should be understood that the rows representing the positioning instructions are not actually stored in the exemplar table.

Referring again to FIG. 11, row 5 provides the position information for the first occurrence of an exemplar for the symbol "l"; row 6 does the same for the first exemplar for the symbol "y"; row 7 is for the exemplar for symbol "h"; row 8 is for the exemplar for symbol "e"; and row 9 provides the position information for the exemplar for the symbol "o".

An exemplary embodiment of this invention includes the following steps to generate the exemplar table generally represented in FIG. 11. First, an exemplar for the symbol "l" is selected. The y position of the occurrence of this exemplar is then identified. The y position for this exemplar is a number represented in FIG. 11 by the letter a. Then the x position of the exemplar for the symbol "l" is identified. The x position is represented in FIG. 11 by the letter b. The width of the exemplar is also determined. This width is measured in pixels and is identified in FIG. 11 by the letter c. Then the height of the exemplar for the symbol "l" is determined and this is represented in FIG. 11 by the letter d. All this information is then stored in the row identified in FIG. 11 by the number 5. It is then determined whether all the exemplars have been evaluated. In this example there are four more exemplars to be evaluated, namely the exemplars for symbols "y", "h", "e" and "o" and the foregoing steps would be repeated for each of these exemplar to completely fill out the table shown in FIG. 11, which generally represents the exemplar table for this example. The exemplar table shown in FIG. 11 represents an exemplary embodiment wherein the exemplars are ordered based on the frequency of occurrence. In other words, the symbol "l" is evaluated or listed first because it occurs twice. The symbol "l" is evaluated or listed before the symbol "y" because it occurs before the first occurrence of the symbol "y". Various other exemplary embodiments of this invention include ordering the evaluation or listing of the exemplars based on parameters such as but not limited to the first occurrence of the respective exemplars, rather than the frequency of occurrence. It should be understood that the actual exemplar table generated from an embodiment of the present invention would not include the actual exemplars or symbols, but rather the location information for an exemplar of each symbol. Conventional methods reproduce and append to the document a reproduction of the exemplar for each symbol in the list, as disclosed in the '368 Patent.

Figure 12:
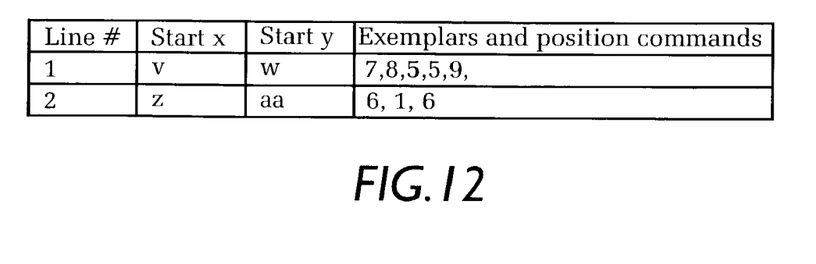
FIG. 12 is an illustration of a representing information that may be contained within block table for the sample document of FIG. 10, according to the present invention.

The block table for this example may be generally thought of as a table, for illustration purposes, as shown in FIG. 12. FIG. 12 displays a block table as a table having a column of block numbers, two columns identifying the x and y starting coordinates, and a column identifying the exemplars that are in each block along with any respective fine-tuning positioning commands.

An exemplary embodiment of this invention would include the following to generate the block table which is generally represented in FIG. 12.

In the example displayed in FIG. 10, there are no figures to be segmented out. The black pixels are then dilated horizontally resulting in two re-determined connected components, which are designated as blocks. In this example there are two blocks. Block 1 is the first or uppermost line with the word "hello" therein, and block 2 is the second or the bottom line with the letters "y" and "y" therein. As shown in the position block of FIG. 12 the blocks 1 and 2 are sorted in the table according their y positioning.

The exemplars and their respective position order for each block are determined as shown in FIG. 12. The exemplars are identified by the exemplar reference numbers from the exemplar table shown in FIG. 11. For example, for block 1 the position block identifies the following exemplars references associated therewith: 7 (representing the letter h); 8 (representing the letter e); 5 (representing the letter l); 5 (representing the second l in the word "hello"); and 9 (representing the letter o). The exemplars references are placed in this order without positioning commands. When reconstructing the document, based on this position block, the letters will be placed side by side on block 1 at a default spacing. For block 2 the table identifies the following exemplar references associated therewith: 6 (representing the letter y); 1 (representing a positioning instruction); and 6 (representing the second y in the block). In this example exemplar reference 1 is a positioning command identifying that the next exemplar is to be moved to the right at a predetermined spacing.

The x and y coordinates for the starting positions of the blocks and the position placements of the exemplar within the blocks are stored. Please note, the actual storing may not necessarily reflect the arrangement of the position block table shown in FIG. 12. In our example, it is noted that the x and y starting coordinates for block 1 is represented as v and y is represented as w. The x and y starting coordinates for block 2 is represented as z and aa, respectively. For example, value z is greater than value v, and value aa is greater than value w.

The following are tables outlining experimental results on four different types of documents namely a mathematical document, a physics document, a French language document and a patent document. Table 1 is comparison of document data file sizes, and bytes, obtained from a conventional compression method CCITT Group-4 (Comit é Consultatif International T é l é phonique et T é l é graphique), a method according to U.S. Pat. No. 5,835,638 and a method according to the present invention. The methods were executed with default settings on all pages. The results for one of the pages, namely the "math page" is represented in two different versions of the page. Particularly, one of the pages is imaged in software from a page description language and the other is a 300 dpi scan. Elsewhere in the table "scan" also refers to a 300 dpi flatbed scan.

TABLE 1

| Test Page | CCITT Group-4 | Method According to U.S. Pat. No. 5,835,638 | Systems and Methods According to Present Invention | Ratio of '638 Method to Present Method |
|---|---|---|---|---|
| Math (original) | 47046 | 8302 | 3003 | 2.76 |
| Math (scan) | 49866 | 13996 | 3411 | 4.10 |
| Physics (original) | 77526 | 14316 | 4826 | 2.97 |
| French (scan) | 91526 | 26109 | 6722 | 3.88 |
| Patent (scan) | 111166 | 19106 | 5139 | 3.72 |

As can be seen from Table 1, the system and method according to the present invention achieve significantly greater savings in connection with the data file size than the conventional method.

Table 2 provides a breakdown of the results above into constituent components for each of the respective methods. "Positions" refer to the entire position block, which includes both exemplar IDs and x-y coordinates. The '638 method also includes a header block, which contains Huffman tables and so forth.

Thus, the total number of bytes in the constituent blocks is less than the overall number given in the Table 1.

TABLE 2

| | Method According to U.S. Pat. No. 5,835,638 | | Systems and Methods According to Present Invention | | |
|---|---|---|---|---|---|
| Test Page | Exemplars | Positions | Exemplars | IDs | X-Y's |
| Math (original) | 4099 | 3742 | 477 | 1878 | 648 |
| Math (scan) | 8825 | 4708 | 663 | 2015 | 733 |
| Physics (original) | 5988 | 6864 | 751 | 3176 | 1111 |
| French (scan) | 17163 | 8485 | 1429 | 4182 | 899 |
| Patent scan | 9533 | 9110 | 730 | 3634 | 775 |

As can be seen from Table 2, the systems and methods according to the present invention achieve significantly better results than the conventional method. While this invention has been described in conjunction with the specific embodiments outlined above, it is evident that many alternatives, modifications and variations will be apparent to those skilled in the art.

Accordingly, the preferred embodiments of the invention, as set forth above, are intended to be illustrative, not limiting. Various changes may be made without departing from the spirit and scope of this invention.

What is claimed is:

1. A method for creating a notarized document from a document, comprising:
   acquiring image data of the document;
   determining connected components within the acquired image data;
   grouping the connected components into exemplars;
   identifying location information of at least one occurrence of an exemplar for each of the exemplars;
   storing the location information in an exemplar table;
   determining a block of the connected components;
   identifying the position of an occurrence of at least one of the exemplars within the block;
   storing the position in a block table;
   generating a document data file based on the image data, the document data file comprising the exemplar table and the block table; and
   appending the document data file to the document to form a notarized document capable of being authenticated.

2. A method as recited in claim 1, further comprising:
   digitally signing the document data file.

3. A method as recited in claim 1, wherein creating the exemplar table comprises:
   identifying a location of at least one occurrence of an exemplar for each of the exemplars;
   determining a dimension of the at least one occurrence of the exemplar from the identifying step; and,
   storing the location and the dimension of the at least one occurrence of the exemplar in the exemplar table.

4. A method as recited in claim 1, further comprising:
   generating a fiducial point for each of the exemplars;
   generating a fine tuning positioning command for at least one of the exemplars;
   storing the fiducial point in the exemplar table;
   storing the fine tuning positioning command in the block table; and
   combining and compressing the exemplar table and the block table.

5. A method as recited in claim 4, wherein generating the fiducial point comprises:
   determining a block of the connected components;
   creating an exemplar histogram for each of the exemplars;
   creating a block histogram for the block;
   defining a baseline for the block;
   determining a baseline crossing for each of the exemplars in the block;
   adding the baseline crossing for each of the exemplars to the respective exemplar histograms;
   determining the median of the baseline crossing values contained in each of the exemplar histograms; and
   designating the median of the baseline crossing values for each of the exemplar histograms as the fiducial point for the respective exemplar.

6. A method as recited in claim 4, further comprising:
   determining a block of the connected components; and
   creating an actual position table that stores actual positions of the connected components on the document,
   wherein generating fine tuning positioning commands comprises:
      selecting at least one connected component of the connected components in the block;
      determining the position of the at least one connected component;
      comparing the position of the at least one connected component to a position of the corresponding connected component in the actual position table to determine if there is a difference; and
      if there is a difference, adding position tuning commands to the block table for the exemplar that corresponds to the selected connected component to correct for the difference.

7. An apparatus that creates a notarized document from a document, comprising:
   a controller;
   a memory that stores image data of the document;
   a connected components determining circuit that determines connected components based on the image data;
   a connected components grouping circuit that groups the connected components into a plurality of groups and generates an exemplar for each of the groups;
   an exemplar table generation circuit that generates an exemplar table by identifying positions of an occurrence for each of the exemplars;
   a block table generation circuit that generates a block table by identifying blocks of the connected components and determining the position of each occurrence for each of the exemplars in each of the blocks;
   a fiducial point generation circuit that generates a fiducial point for each of the exemplars and adds the fiducial point for each of the exemplars to the exemplar table; and
   a data appending circuit that appends the exemplar table and the block table to the document to create a notarized document capable of being authenticated,
   wherein the controller operates the connected components determining circuit, the connected components grouping circuit, the exemplar table generation circuit, the block table generation circuit, the fiducial point generation circuit and the data appending circuit.

8. An apparatus as recited in claim 7, further comprising a digital signing circuit that digitally signs the block table and the exemplar table.

9. An apparatus as recited in claim 7, further comprising a position tuning circuit that adds positioning commands to the block table for each of the blocks based on a comparison of a placement of each of the connected components derived from the block table and the exemplar table to positions of the connected components.

10. An apparatus as recited in claim 7, wherein:
    the fiducial point generation circuit generates the fiducial point for each of the exemplars by:
       creating an exemplar histogram for the exemplars;
       generating a block histogram for each of the blocks;
       defining a baseline for each of the blocks;
       determining a baseline crossing for each of the exemplars in each of the blocks;
       adding the baseline crossings for each of the exemplars to the respective exemplar histograms;
       determining the median of the baseline crossings in each of the exemplar histograms; and
       designating the median of the baseline crossings for each of the exemplar histograms as the fiducial point for the respective exemplar.

11. An apparatus as recited in claim 7, further comprising an image data source that provides the image data to the memory.

12. An apparatus as recited in claim 7, further comprising an input device that provides commands to the controller.

13. An apparatus as recited in claim 7, further comprising a printer that prints the notarized document.

14. An apparatus as recited in claim 7, further comprising a display that displays the notarized document.

15. An apparatus that verifies the authenticity of a notarized document, comprising:
    a controller;
    a memory that stores image data of the notarized document that includes a document data file containing an exemplar table and a block table;
    a data reading circuit that reads the document data file and outputs to the memory the exemplar table and the block table of the document data file;
    a decompression circuit that constructs a verifying document image using the exemplar table and the block table; and
    a comparing circuit that compares the verifying document image to the image data of the notarized document and determines that the notarized document is not genuine if there are discrepancies between the verifying document image and the image data of the notarized document.

16. An apparatus, as recited in claim 15, further comprising a verifying circuit that verifies a digital signature of the document data file.

* * * * *